(12) United States Patent
Buczak (10) Patent No.: US 6,922,680 B2
(45) Date of Patent: Jul. 26, 2005

(54) METHOD AND APPARATUS FOR RECOMMENDING AN ITEM OF INTEREST USING A RADIAL BASIS FUNCTION TO FUSE A PLURALITY OF RECOMMENDATION SCORES

(75) Inventor: Anna L. Buczak, Briarcliff Manor, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 434 days.

(21) Appl. No.: 10/101,325

(22) Filed: Mar. 19, 2002

(65) Prior Publication Data

US 2003/0182249 A1 Sep. 25, 2003

(51) Int. Cl.[7] ................................................. G06E 1/00
(52) U.S. Cl. .......................................... 706/15; 706/22
(58) Field of Search ....................................... 706/15, 22

(56) References Cited

U.S. PATENT DOCUMENTS

| | | | |
|---|---|---|---|
| 5,410,344 A | 4/1995 | Graves et al. | 348/1 |
| 6,020,883 A | 2/2000 | Herz et al. | 345/327 |
| 2002/0171603 A1 * | 11/2002 | Chen et al. | 345/1.1 |

FOREIGN PATENT DOCUMENTS

WO      0004708 A1      1/2000

OTHER PUBLICATIONS

Gutta et al., "TV Content Recommender System," Proceedings of the 17th National Conference of AAAI, (2000).
Kurapati et al., "A Multi–Agent TV Recommender," Workshop on Personalization in Future TV, User Modeling, (2001).
"Fast Learning in Networks of Locally Tuned Processing Units", by J. Moody and C.J. Darken, Neural Computation, vol. 1, pp. 281–294, 1989.
"Neural Networks: A Comprehensive Foundation", by Simon Haykin, Prentice Hall, pp. 256–317, 1999.

* cited by examiner

*Primary Examiner*—George B. Davis (57) ABSTRACT

A method and apparatus are disclosed for recommending items of interest by fusing a plurality of recommendation scores from individual recommendation tools using one or more Radial Basis Function neural networks. The Radial Basis Function neural networks include N inputs and at least one output, interconnected by a plurality of hidden units in a hidden layer. A unique neural network can be used for each user, or a neural network can be shared by a plurality of users, such as a set of users having similar characteristics. A neural network training process initially trains each Radial Basis Function neural network using data from a training data set. A neural network cross-validation process selects the Radial Basis Function neural network that performs best on the cross-validation data set. A neural network program recommendation process uses the selected neural network(s) to recommend items of interest to a user.

20 Claims, 7 Drawing Sheets

FIG. 1

PROGRAM DATABASE - 200

| DATE/TIME 240 | CHANNEL 245 | TITLE 250 | GENRE 255 | ... | ACTOR 270 |
|---|---|---|---|---|---|
| 11/18/99 -- 8:00 P.M. | WCNC | LUCY | COMEDY | | CLINT DENIRO |
| 11/18/99 -- 8:30 P.M. | WABS | AL'S FAMILY | SITCOM | | JENNIFER COX |
| ... | | | | | |
| 11/18/99 -- 9:00 P.M. | WNBS | YOUR HOUSE | DRAMA | | LUCY VANCE |

GROUND TRUTH DATASET - 300

| DATE/TIME 340 | CHANNEL 345 | TITLE 350 | GENRE 355 | ... | ACTOR 370 | USER SCORE 375 |
|---|---|---|---|---|---|---|
| 11/18/99 -- 8:00 P.M. | WCNC | LUCY | COMEDY | | CLINT DENIRO | 1.0 |
| 11/18/99 -- 8:30 P.M. | WABS | AL'S FAMILY | SITCOM | | JENNIFER COX | 0 |
| 11/18/99 -- 9:00 P.M. | WNBS | YOUR HOUSE | DRAMA | | LUCY VANCE | 0.5 |

METHOD AND APPARATUS FOR RECOMMENDING AN ITEM OF INTEREST USING A RADIAL BASIS FUNCTION TO FUSE A PLURALITY OF RECOMMENDATION SCORES

FIELD OF THE INVENTION

The present invention relates to methods and apparatus for recommending items of interest, such as television programs, and more particularly, to techniques for recommending programs and other items of interest based on a plurality of individual recommendation scores.

BACKGROUND OF THE INVENTION

As the number of channels available to television viewers has increased, along with the diversity of the programming content available on such channels, it has become increasingly challenging for television viewers to identify television programs of interest. Electronic Program Guides (EPGs) identify available television programs, for example, by title, time, date and channel, and facilitate the identification of programs of interest by permitting the available television programs to be searched or sorted in accordance with personalized preferences.

A number of recommendation tools have been proposed or suggested for recommending television programs and other items of interest. Television program recommendation tools, for example, apply viewer preferences to an EPG to obtain a set of recommended programs that may be of interest to a particular viewer. Generally, television program recommendation tools obtain the viewer preferences using implicit or explicit techniques, or using some combination of the foregoing. Implicit television program recommendation tools generate television program recommendations based on information derived from the viewing history of the viewer, in a non-obtrusive manner. Explicit television program recommendation tools, on the other hand, explicitly question viewers about their preferences for program attributes, such as title, genre, actors and channel, to derive viewer profiles and generate recommendations.

While such recommendation tools can effectively identify items of interest, they suffer from a number of limitations, which, if overcome, could greatly improve the performance and reliability of such recommendation tools. In particular, it has been observed that different recommendation tools will generally provide significantly different recommendations for the same data set, such as a listing of the available programs on a given evening. Thus, if a user employed three different recommendation tools to a listing of the available programs on a given evening, the user would likely get three different sets of recommendations. The differences in the generated recommendations are due to different recommendation tools using different, often complementary, information. For example, the explicit information obtained from a given user is substantially different from the implicit information ascertained from the user's viewing history. In addition, different recommendation mechanisms typically have their own biases.

A need therefore exists for a method and apparatus for generating reliable recommendations that take advantage of the recommendations generated by a number of different recommendation tools. A further need exists for a method and apparatus for generating recommendations based on the recommendations of a number of different recommendation tools.

SUMMARY OF THE INVENTION

Generally, a method and apparatus are disclosed for recommending items of interest, such as television programs, based on recommendation scores generated by a number of different recommendation tools. More specifically, the disclosed neural network recommendation tool fuses a plurality of recommendation scores from individual recommendation tools using one or more Radial Basis Function neural networks, to generate a single fused recommendation score for each available item.

The Radial Basis Function (RBF) neural networks employed by the present invention include N inputs and at least one output, interconnected by a plurality of hidden units in a hidden layer. The various recommendation scores from the individual recommendation tools are applied to the N inputs (one input for each individual recommendation tool) and are fused using the RBF neural network to generate a single fused recommendation score at the output of the RBF neural network. A unique neural network can be used for each user, or a neural network can be shared by a plurality of users, such as a set of users having similar characteristics.

From the process point of view, a neural network training process typically trains a number of different Radial Basis Function neural networks for each user or set of users, using data from a training data set. From the set of trained networks, the cross-validation process selects the RBF neural network that performs best on the cross-validation data set. Finally, a neural network program recommendation process uses the selected neural network(s) to recommend items of interest to a user.

A more complete understanding of the present invention, as well as further features and advantages of the present invention, will be obtained by reference to the following detailed description and drawings.

DETAILED DESCRIPTION

Figure 1:
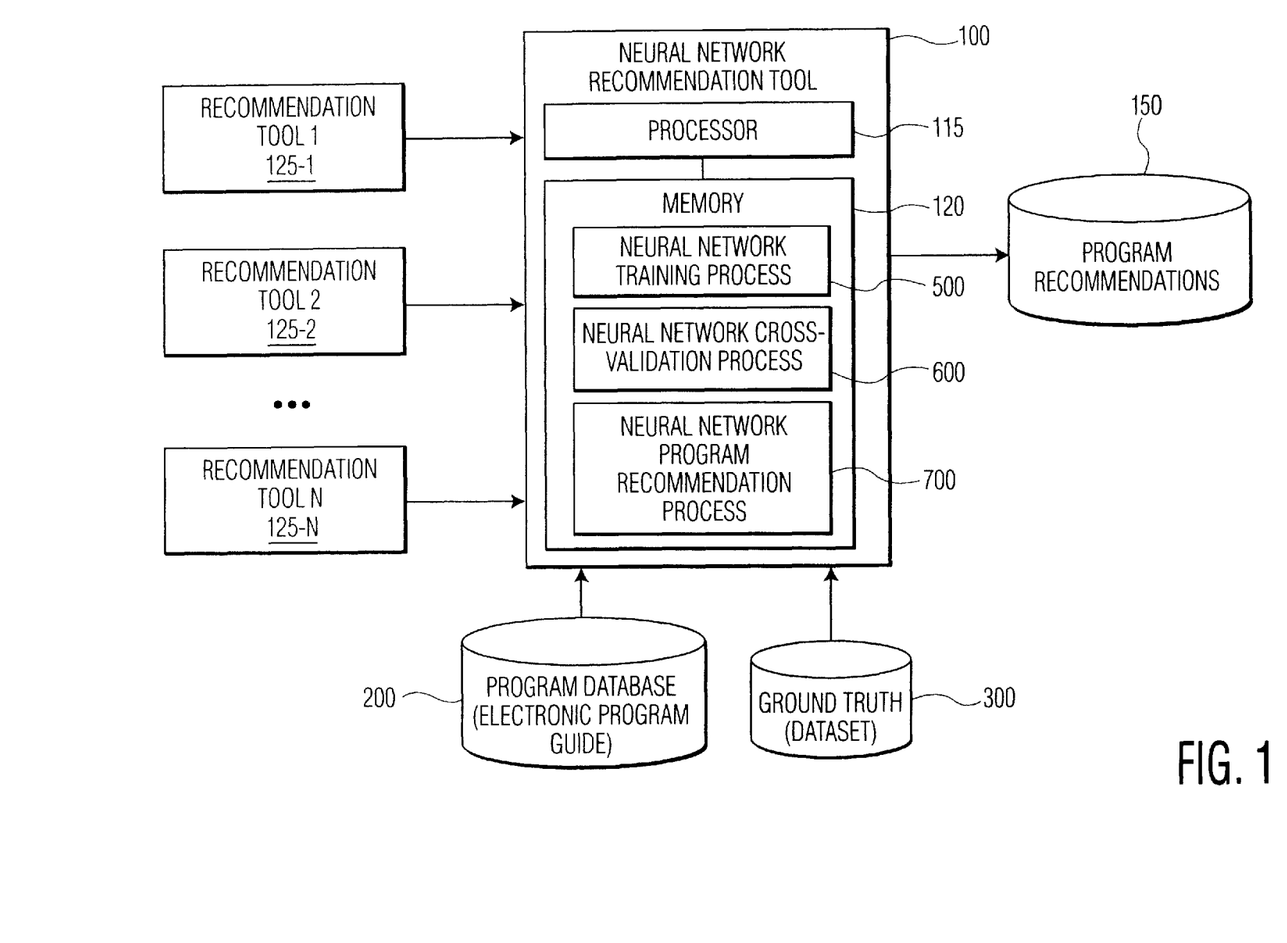
FIG. 1 is a schematic block diagram of a neural network recommendation tool in accordance with the present invention.

FIG. 1 illustrates a neural network recommendation tool 100 in accordance with the present invention. As shown in FIG. 1, the exemplary neural network recommendation tool 100 evaluates programs in a program database 200, discussed below in conjunction with FIG. 2, to identify programs of interest to a particular user. The set of recommended programs can be presented to the viewer, for example, using a set-top terminal/television (not shown) using well-known on-screen presentation techniques. While the present invention is illustrated herein in the context of television programming recommendations, the present invention can be applied to any automatically generated recommendations that are based on an evaluation of user behavior, such as a viewing history or a purchase history.

According to one feature of the present invention, the neural network recommendation tool 100 generates recommendations based on the recommendation scores generated by a plurality of recommendation tools 125-1 through 125-N, hereinafter, collectively referred to as individual recommendation tools 125. Generally, the neural network recommendation tool 100 fuses the recommendation scores from the individual recommendation tools 125 at the decision level, using one or more Radial Basis Function neural networks, to generate a single recommendation score for each available item. As discussed further below, a unique neural network can be generated for each user, or a neural network can be shared by a plurality of users, such as a set of users having similar characteristics or even the whole population of users.

The neural network recommendation tool 100 may be embodied as a general purpose computing system, such as the general purpose computing system shown in FIG. 1. The neural network recommendation tool 100 includes a processor 115 and related memory, such as a data storage device 120, which may be distributed or local. The processor 115 may be embodied as a single processor, or a number of local or distributed processors operating in parallel. The data storage device 120 and/or a read only memory (ROM) are operable to store one or more instructions, which the processor 115 is operable to retrieve, interpret and execute. In a further variation, the neural network recommendation tool 100 and/or the individual recommendation tools 125 may be embodied as an application specific integrated circuit (ASIC), for example, in a set-top terminal or display (not shown).

As shown in FIG. 1 and discussed further below in conjunction with FIGS. 5 through 6, the data storage device (memory) 120 includes a neural network training process 500, a neural network cross-validation process 600 and a neural network program recommendation process 700. Generally, the neural network training process 500 is employed to train one or more Radial Basis Function neural networks 400, discussed below in conjunction with FIG. 4, using data from a ground truth data set 300, discussed below in conjunction with FIG. 3. Typically, the ground truth data set 300 is comprised of data from the viewing history of one or more users and contains an indication of whether a given program was liked. The neural network cross-validation process 600 is employed to select the Radial Basis Function neural network 400 that performs best on a cross-validation data set for a given user or set of users. Finally, the neural network program recommendation process 700 is employed to recommend items of interest to a user using the trained neural network 400.

The individual recommendation tools 125 may be embodied as any available recommendation tool, such as the Tivo™ system, commercially available from Tivo, Inc., of Sunnyvale, Calif., or the recommendation tools described, for example, in S. Gutta et al., "TV Content Recommender System," Proc. of the 17$^{th}$ Nat'l Conf. of AAAI, Austin, Tex. (2000) K. Kurapati et al., "Multi-Agent TV Recommender", Workshop on Personalization in Future TV, User Modeling 2001, Sonthofen, Germany (July 2001); U.S. patent application Ser. No. 09/466,406, filed Dec. 17, 1999, entitled "Method and Apparatus for Recommending Television Programming Using Decision Trees," U.S. patent application Ser. No. 09/498,271, filed Feb. 4, 2000, entitled "Bayesian TV Show Recommender," and U.S. patent application Ser. No. 09/627,139, filed Jul. 27, 2000, entitled "Three-Way Media Recommendation Method and System," U.S. patent application Ser. No. 10/014,195, filed Nov. 13, 2001, entitled "Method and Apparatus for Recommending Items of Interest Based on Stereotype References of Third Parties," or any combination thereof, each incorporated herein by reference.

The individual recommendation tools 125 may obtain the viewer preferences using implicit or explicit techniques, and may generate recommendations based on such viewer preferences using Bayesian (B) or Decision Tree (DT) techniques, Support Vector Machines, neural networks or some other method. As previously indicated, explicit recommenders uses direct responses from the users about the types of programs, channels and program characteristics they like and dislike. Implicit recommenders use the viewing histories of the subjects to derive the viewing preferences of users. Viewing histories can be based, for example, on TV watching history or video/DVD rental history. Based on the viewing histories, Bayesian, Decision Tree, neural networks and Support Vector Machines recommenders build user profiles (for the individual or household or both), in a known manner.

In a further variation, the recommendations generated by the individual recommendation tools 125 may be updated using a feedback feature that allows the user to indicate whether the user likes or dislikes some of the recommendations provided by the system 100. For a more detailed discussion of a method and apparatus for updating a recommendation tool using user feedback, see, for example, U.S. patent application Ser. No. 09/718,261, filed Nov. 22, 2000, entitled "Method and Apparatus for Obtaining Auditory and Gestural Feedback in a Recommendation System," incorporated by reference herein.

Databases

As shown in FIG. 1, and discussed further below in conjunction with FIGS. 2 and 3, the neural network recommendation tool 100 employs a program database 200 and a ground truth data set 300. Generally, the program database 200 may be embodied as a well-known electronic program guide (EPG) and records information for each program that is available in a given time interval. The exemplary ground truth data set 300 is collected from a number of users and indicates whether the users would like or dislike a given program.

Figure 2:
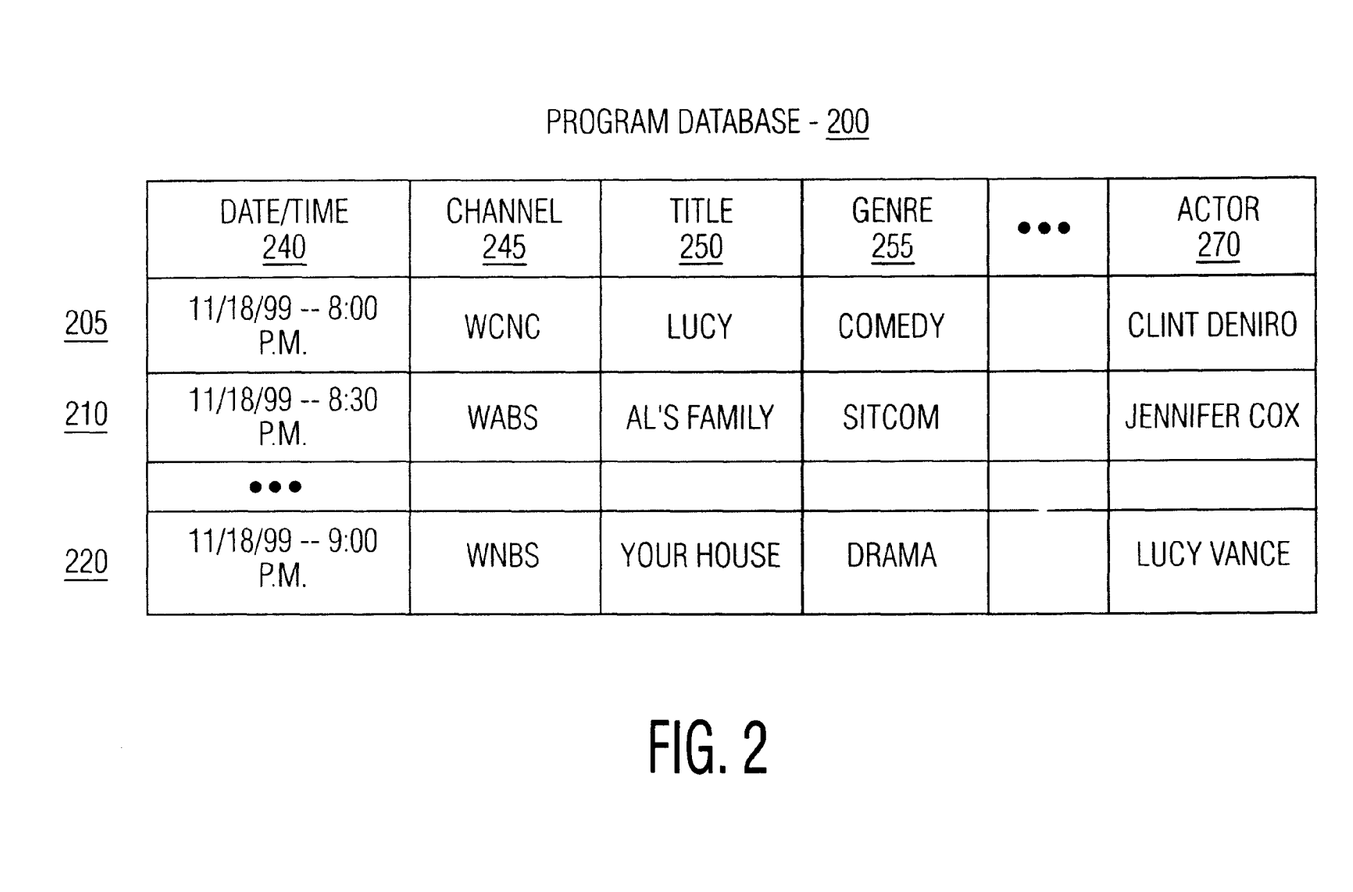
FIG. 2 is a sample table from an exemplary program database of FIG. 1.

FIG. 2 is a sample table from the program database (EPG) 200 of FIG. 1. As previously indicated, the program database 200 records information for each program that is available in a given time interval. As shown in FIG. 2, the program database 200 contains a plurality of records, such as records 205 through 220, each associated with a given program. For each program, the program database 200 indicates the date/time and channel associated with the program in fields 240 and 245, respectively. In addition, the title, genres and actors for each program are identified in fields 250, 255 and 270, respectively. Additional well-known features (not shown), such as directors, producers, duration and description of the program, can also be included in the program database 200.

Figure 3:
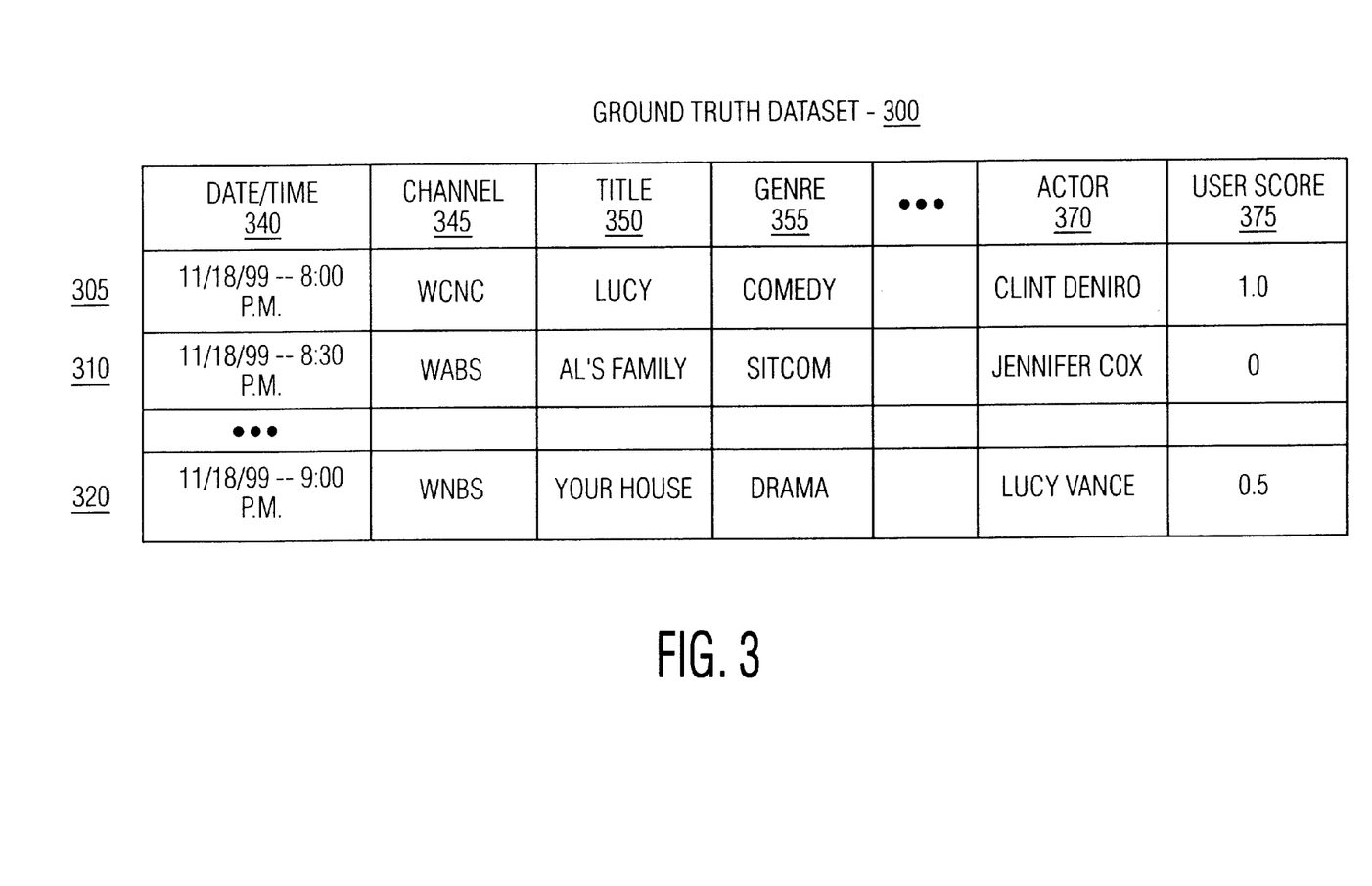
FIG. 3 is a sample table from an exemplary ground truth database of FIG. 1.

FIG. 3 is a sample table from the ground truth data set 300 of FIG. 1. As previously indicated, the ground truth data set 300 indicates whether a given user would (i) watch (1.0), (ii)

not watch (0), or (iii) maybe would watch (0.5) each program in a given set of programs. The preferences indicated in the ground truth data set 300 may be obtained implicitly or explicitly. As discussed below in conjunction with FIGS. 5 and 6, the preferences indicated in the ground truth data set 300 are used to train, validate and evaluate the Radial Basis Function neural network(s) 400.

As shown in FIG. 3, the ground truth data set 300 contains a plurality of records, such as records 305, 310, 320, each associated with a given program. The ground truth data set 300 shown in FIG. 3 has the same fields 340–370 as discussed above in conjunction with the program database 200 of FIG. 2, with an added field 375 to indicate the user score (indicating whether the user would likely watch the corresponding program). It is noted that the ground truth data set 300 can be comprised of a subset of the programs in the program database 200.

Neural Networks

Figure 4:
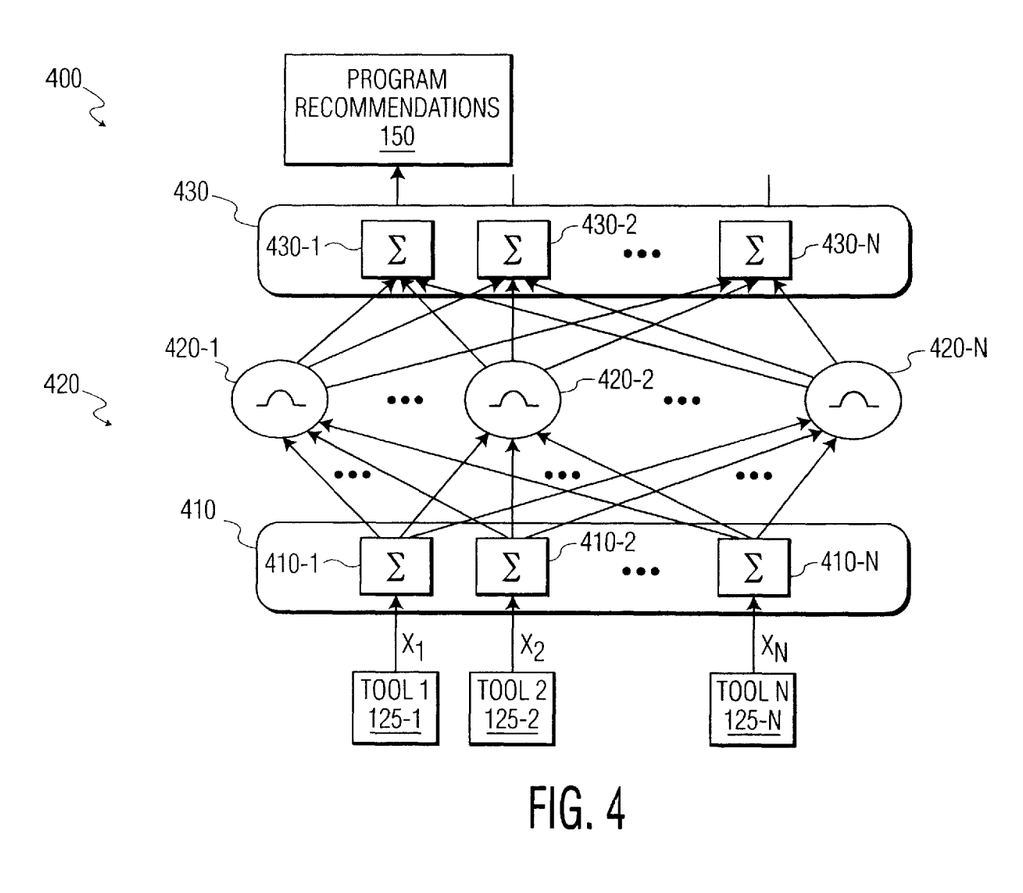
FIG. 4 is a schematic block diagram of a neural network recommendation tool in accordance with the present invention.

As previously indicated, the present invention fuses the recommendation scores generated by a plurality of recommendation tools 125-1 through 125-N, using one or more Radial Basis Function neural networks 400, shown in FIG. 4. For a detailed discussion of Radial Basis Function neural network 400, see, for example, J. Moody & C. J. Darken, "Fast Learning in Networks of Locally Tuned Processing Units", Neural Computation, vol. 1, 281–94 (1989) or Simon Haykin, "Neural Networks: A Comprehensive Foundation," Prentice Hall, 256–317 (1999), each incorporated by reference herein.

Artificial neural networks (ANNs) are data processing systems consisting of a large number of simple, highly interconnected elements (called neurons) in an architecture inspired by the cerebral cortex portion of the brain. ANNs have the ability to model processes from actual data through learning and generalization. Generally, artificial neural networks recognize patterns in the presence of noise, and when the data is sparse or incomplete. Artificial neural networks perform matching in high-dimensional spaces, effectively interpolating and extrapolating from data. This makes ANNs an effective tool for real-time classification, trending and prediction. Radial Basis Function networks were chosen for the fusion process since they are universal approximators, and train rapidly (for example, usually orders of magnitude faster than backpropagation). The rapid training of RBF networks makes them suitable for applications where on-line incremental learning is desired.

In an implementation where a separate Radial Basis Function neural network 400 is employed for each user, then the RBF neural network 400 is specifically trained on the training data from the ground truth data set 300 for that user, thereby ensuring that the network is responsive to the characteristics of that particular user. In one exemplary implementation, about forty percent (40%) of the data from the ground truth data set 300 was used for training, fifteen percent (15%) for cross-validation, and the whole data set was used for recall to evaluate performance. It is generally desirable that the same amount of programs classified as 0, 0.5, and 1 be used for training.

In an implementation where a single Radial Basis Function neural network 400 is employed for a plurality of users, then the RBF neural network 400 is trained using the data from the collective set of all associated users or from a sample of such associated users. In one exemplary implementation, 15% to 40% of data from subjects A, C, and D was used as the training set (this represents 26% of the whole data set); 14% to 45% of data from subjects D, F, and G was used for cross-validation (this represents 13% of the whole data set) and all the data was used for recall. Data from users H and I was not used for training or cross-validation. This method has the advantage that it can be developed using the Ground Truth (GT) data stored in field 375 of the data set 300 from the subjects in our study. Later, this fusion network could be adapted to individual users by using their thumbs up and thumbs down feedback to system recommendations.

FIG. 4 is a schematic block diagram of a Radial Basis Function neural network 400 in accordance with the present invention. As shown in FIG. 4, the RBF neural network 400 includes three layers, 410, 420, 430. The nodes 420-1 through 420-N in the pattern (hidden layer) 420 perform a Radial Basis Function transformation, such as a Gaussian transformation, discussed below in conjunction with Equation 1. As shown in FIG. 4, the input layer 410 is fully connected to the pattern layer 420, and the pattern layer units 420-$i$ are fully connected to the output units 430-$i$ that employ a linear transfer function.

As shown in FIG. 4, the Radial Basis Function neural network 400 has N inputs (corresponding to the N individual recommendation tools 125) and one output (the fused program recommendations). The N inputs are the recommendation scores generated by the N individual recommendation tools 125.

As discussed below in conjunction with FIG. 5, each of the connections between the input layer 410 and the pattern (hidden layer) 420 are assigned a weight during an initial learning phase. Likewise, each of the connections between the pattern (hidden layer) 420 and the output layer 430 are assigned a weight during a second learning phase. A number of different RBF neural networks 400 each having a different number of hidden units in the pattern (hidden layer) 420 can be trained for each user or set of users during the training phase. The Radial Basis Function neural network 400 that performs best on a cross-validation set is then selected during a validation stage, discussed below in conjunction with FIG. 6, for each user or set of users.

An often used type of transfer function for the hidden layer 420 is the following Gaussian function:

$$h(x) = \exp\left(\frac{(x-u)^2}{2 \cdot \text{sigma}^2}\right) \quad \text{Eq. (1)}$$

where x is the input vector and u is the center of the Radial Basis Function. When x=u, h(x) is 1. Thus, u determines the value of x that produces the maximum output of the neuron. The response at other values of x, drops rapidly as x deviates from u, becoming negligible in value when x is far from u. The output has a significant response to the input x only over a range of values of x called the receptive field of the neuron. The size of the receptive field is determined by sigma. When the input vector is N-dimensional, the receptive field is N-dimensional as well.

Training and Validation of the Neural Network(s)

As previously indicated, each of the connections in the Radial Basis Function neural network 400 between the input layer 410 and the pattern (hidden layer) 420 and between the pattern (hidden layer) 420 and the output layer 430 are assigned weights during a training phase.

Figure 5:
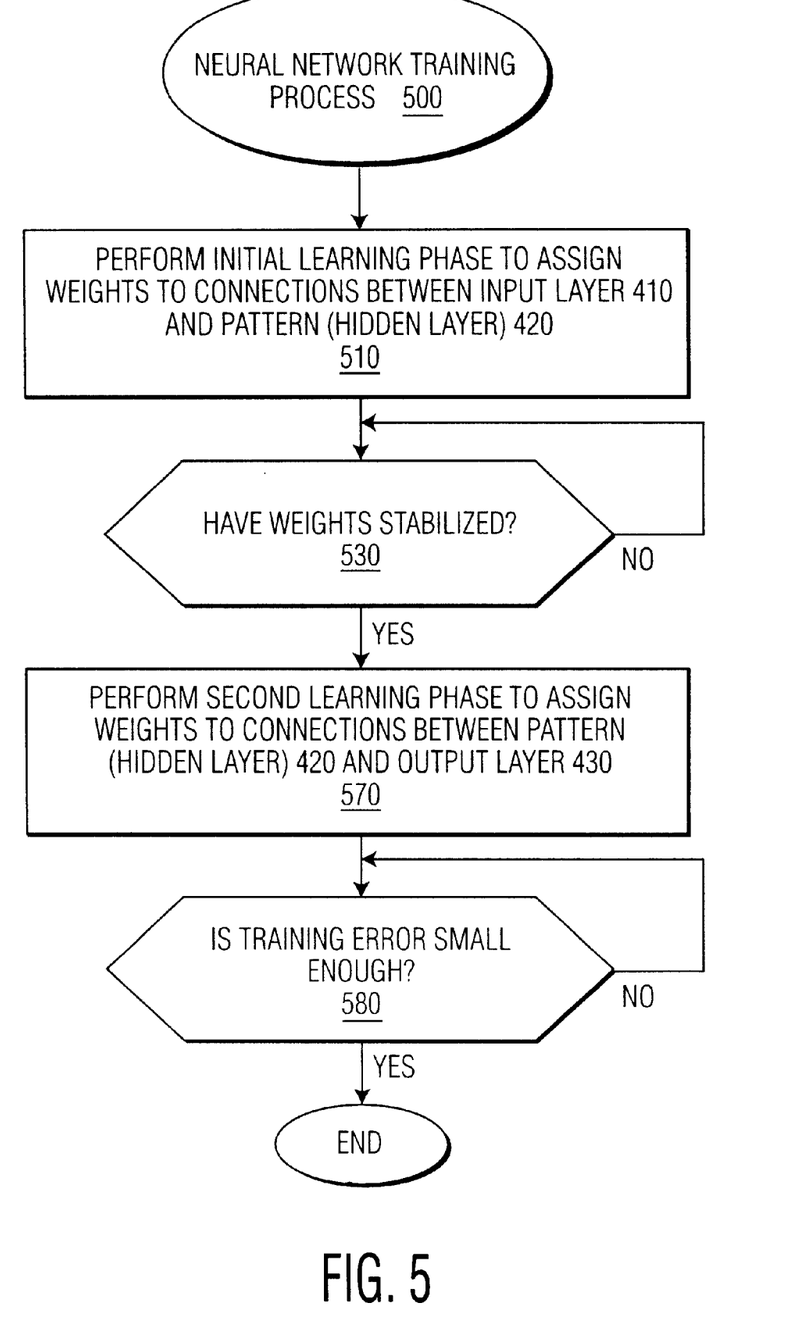
FIG. 5 is a flow chart describing the neural network training process of FIG. 1 embodying principles of the present invention.

FIG. 5 is a flow chart describing an exemplary implementation of a neural network training process 500 in accordance with the present invention. The neural network training process 500 is employed to train one or more radial basis function neural networks 400 for each user or set of users. As shown in FIG. 5, the exemplary neural network training process 500 initially performs an initial learning phase during step 510 to assign weights to the connections in the Radial Basis Function neural network 400 between the input layer 410 and the pattern (hidden layer) 420. Generally, step 510 estimates the location of the radial-basis function centers using an unsupervised learning method, such as a K-means clustering technique, as described in R. O. Duda and P. E. Hart, Pattern Classification and Scene Analysis, John Wiley & Sons (1973), incorporated by reference herein.

A test is performed in a known manner during step 530 to determine if the weights have stabilized. If it is determined during step 530 that the weights have not stabilized, then program control returns to step 530 until the weights have stabilized. Once it is determined during step 530 that the weights have stabilized, then program control proceeds to step 570 where a second learning phase is initiated.

The second learning phase performed during step 570 assigns weights to the connections in the Radial Basis Function neural network 400 between the pattern (hidden layer) 420 and the output layer 430. For example, a linear regression or gradient descent technique may be employed during step 570 to determine the appropriate weights, in a known manner.

A test is performed during step 580 to determine if the training error is small enough. For example, the weight training may continue until the error rate stops improving by some predefined minimum amount. If it is determined during step 580 that the training error is not small enough, then program control returns to step 570 until the training error is small enough. Once it is determined during step 580 that the training error is small enough, then program control proceeds to step 590 where program control terminates. It is noted that the Radial Basis Function neural network 400 can optionally be retrained over time, or in real-time, to improve performance as more ground truth data gets collected.

The training is performed for each user and for each number of hidden units identified as being viable. Once the Radial Basis Function neural network 400 is trained for each variation, the performance can be assessed using the neural network cross-validation process 600, discussed below in conjunction with FIG. 6, to select the RBF neural network 400 with the best configuration.

Each RBF neural network 400 trained by the neural network training process 500 is evaluated in terms of Hit Rate and False Positive Rate on the cross-validation data set. The trained neural network 400 with the best performance (highest Hit Rate while small False Positive Rate) is chosen as the RBF neural network 400 to be used. As such, the selected RBF neural network 400 has a certain number of hidden units and has weights as they were determined by the neural network training process 500.

Figure 6:
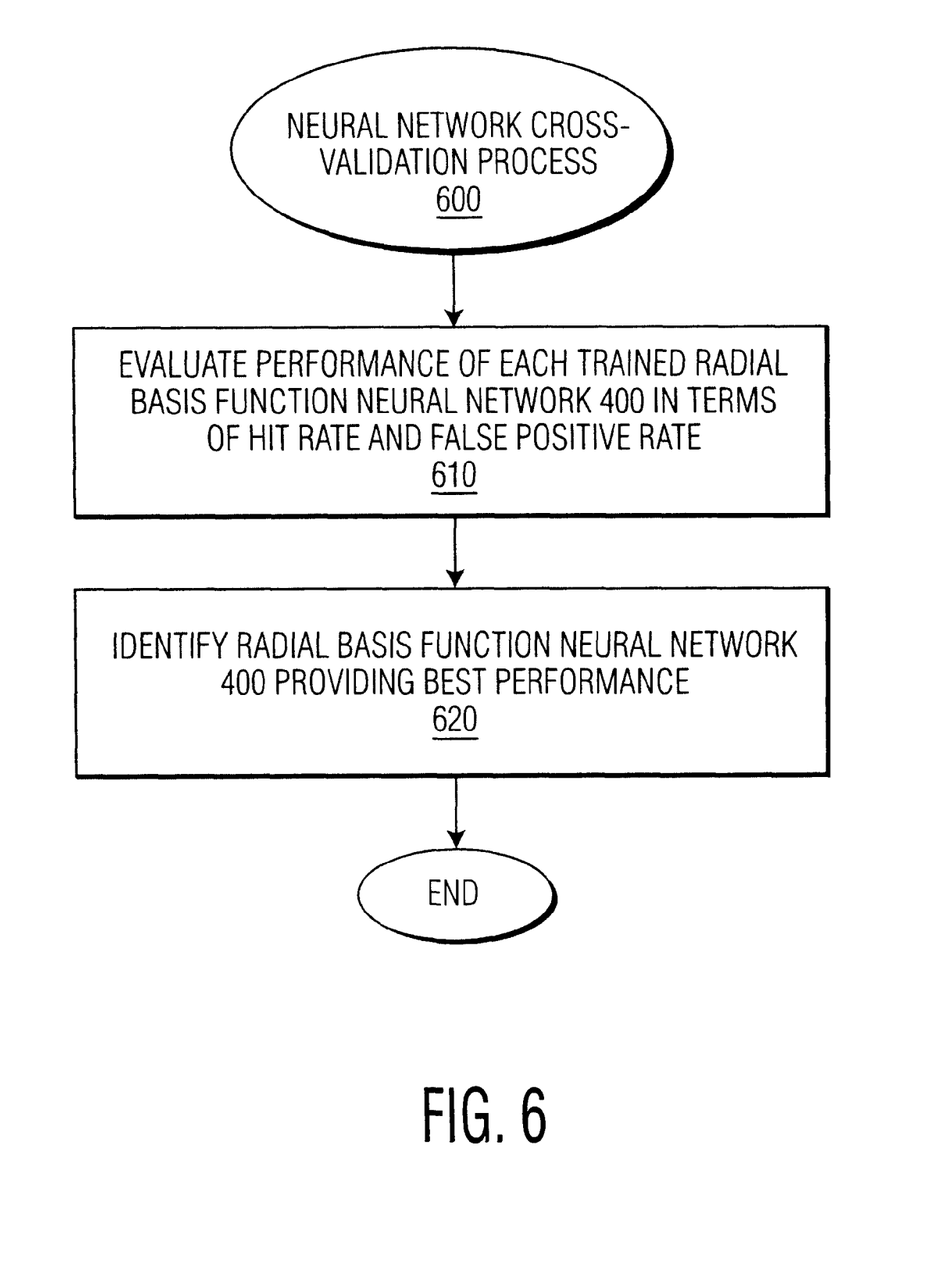
FIG. 6 is a flow chart describing the neural network cross-validation process of FIG. 1 embodying principles of the present invention.

FIG. 6 is a flow chart describing an exemplary implementation of the neural network cross-validation process 600. It is noted that any known validation process can be employed by the neural network cross-validation process 600 and that portions of the cross-validation process 600 can be implemented using automatic (i.e., computer-controlled) or manual techniques. As shown in FIG. 6, the exemplary neural network cross-validation process 600 initially evaluates the performance on the cross-validation set of each trained Radial Basis Function neural network 400 using the Hit Rate and the False Positive Rate during step 610. Alternatively, another cross-validation process could use the Mean Squared Error to compare the networks. It is noted that the ground truth data set 300 indicates whether a user actually liked or disliked a given program in the cross-validation data set.

Thus, the recommendations generated by the neural network recommendation tool 100 using a given Radial Basis Function neural network 400 configuration are compared to the user's viewing preference indicated in the ground truth data set 300 to evaluate the performance of a given neural network configuration. As previously indicated, one exemplary implementation compared the fusion results using three metrics. Hit Rate and False Positive Rate can be computed for all shows that were classified by the user as 0 (wouldn't like to watch) or 1 (would like to watch). For the shows classified as 0.5 (maybe would watch) it is questionable whether the programs should be recommended by the neural network recommendation tool 100 or not. Thus, Hit Rate and False Positive Rate were computed only on shows that were crisply classified as 1 or 0. It is noted that a higher Hit Rate a lower False Positive Rate indicate better performance. However, all programs can be included in a Mean Squared Error metric.

Thereafter, the Radial Basis Function neural network 400 providing the best performance in terms of Hit Rate and False Positive Rate on the cross-validation set is selected during step 620 for each user or set of users. Program control then terminates.

Figure 7:
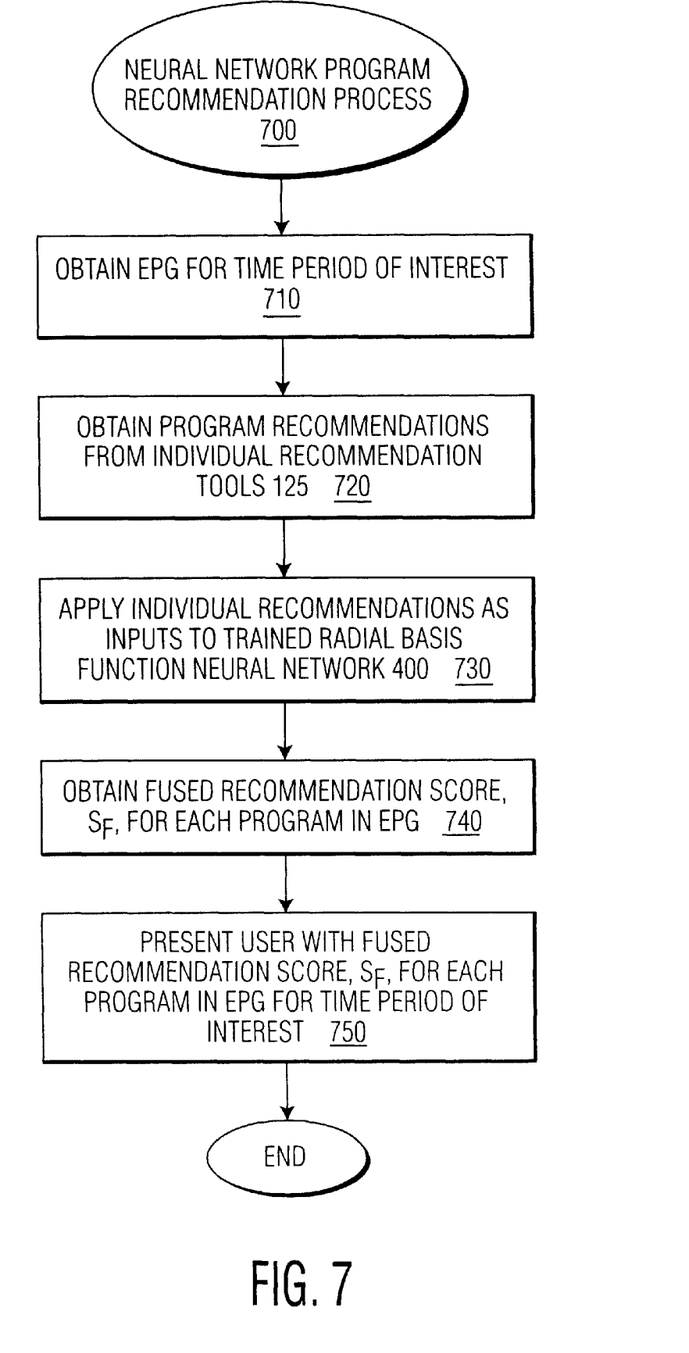
FIG. 7 is a flow chart describing the neural network program recommendation process of FIG. 1 embodying principles of the present invention.

FIG. 7 is a flow chart describing the neural network program recommendation process 700 embodying principles of the present invention. The neural network program recommendation process 700 processes the individual recommendations generated by the individual recommendation tools 125 and generates a single fused recommendation score, $S_F$, for each available item, such as each available program in a time period of interest.

As shown in FIG. 7, the neural network program recommendation process 700 initially obtains the electronic program guide (EPG) 200 during step 710 for the time period of interest. Thereafter, the individual program recommendations are obtained from the various individual recommendation tools 125 during step 720.

The neural network program recommendation process 700 then applies the individual recommendations as inputs to the trained Radial Basis Function neural network 400 during step 730. The neural network program recommendation process 700 obtains the fused recommendation score, $S_F$, for each program in the EPG 200 for the time period of interest during step 740.

Finally, the fused program recommendation score, $S_F$, for each program in the time period of interest can be presented to the user during step 750, for example, using on-screen programming techniques, before program control terminates during step 760.

It is to be understood that the embodiments and variations shown and described herein are merely illustrative of the principles of this invention and that various modifications may be implemented by those skilled in the art without departing from the scope and spirit of the invention.

What is claimed is:

1. A method for recommending one or more available items, comprising the steps of:

obtaining an individual recommendation score for one or more of said available items from each of a plurality of recommendation tools; and generating a fused recommendation score for at least one of said available items by combining said plurality of individual recommendation scores using at least one Radial Basis Function neural network.

2. The method of claim 1, wherein said one or more items are content.

3. The method of claim 1, wherein said one or more items are products.

4. The method of claim 1, further comprising the step of training said Radial Basis Function neural network using a training data set.

5. The method of claim 4, wherein a plurality of said radial basis function neural networks are trained and further comprising the step of selecting a Radial Basis Function neural network that performs best on a cross-validation data set.

6. The method of claim 1, wherein a unique Radial Basis Function neural network is associated with each user.

7. The method of claim 1, wherein a Radial Basis Function neural network is associated with a plurality of users.

8. A method for recommending one or more available items, comprising the steps of:

generating a Radial Basis Function neural network having N inputs and at least one output;

obtaining N individual recommendation scores for one or more of said available items from a plurality of recommendation tools;

applying said N individual recommendation scores to said N inputs; and generating a fused recommendation score at said output of said Radial Basis Function neural network.

9. The method of claim 8, wherein said one or more items are content.

10. The method of claim 8, wherein said one or more items are products.

11. The method of claim 8, further comprising the step of training said Radial Basis Function neural network using a training data set.

12. The method of claim 11, wherein a plurality of said radial basis function neural networks are trained and further comprising the step of selecting a Radial Basis Function neural network that performs best on a cross-validation data set.

13. The method of claim 8, wherein a unique Radial Basis Function neural network is associated with each user.

14. The method of claim 8, wherein a Radial Basis Function neural network is associated with a plurality of users.

15. A system for recommending one or more available items, comprising:

a memory for storing computer readable code; and a processor operatively coupled to said memory, said processor configured to:

obtain an individual recommendation score for one or more of said available items from each of a plurality of recommendation tools; and generate a fused recommendation score for at least one of said available items by combining said plurality of individual recommendation scores using at least one Radial Basis Function neural network.

16. The system of claim 15, wherein said processor is further configured to train said Radial Basis Function neural network using a training data set.

17. The system of claim 15, wherein a plurality of said radial basis function neural networks are trained and wherein said processor is further configured to select a Radial Basis Function neural network that performs best on a cross-validation data set.

18. An article of manufacture for recommending one or more available items, comprising:

a computer readable medium having computer readable code means embodied thereon, said computer readable program code means comprising:

a step to obtain an individual recommendation score for one or more of said available items from each of a plurality of recommendation tools; and a step to generate a fused recommendation score for at least one of said available items by combining said plurality of individual recommendation scores using at least one Radial Basis Function neural network.

19. A system for recommending one or more available items, comprising:

at least one Radial Basis Function neural network having N inputs and at least one output;

a memory for storing computer readable code; and a processor operatively coupled to said memory, said processor configured to:

obtain N individual recommendation scores for one or more of said available items from a plurality of recommendation tools;

apply said N individual recommendation scores to said N inputs; and generate a fused recommendation score at said output of said Radial Basis Function neural network.

20. The system of claim 19, wherein said processor is further configured to train said Radial Basis Function neural network using a training data set.

* * * * *